(12) United States Patent
Brodie et al.

(10) Patent No.: US 6,643,587 B2
(45) Date of Patent: *Nov. 4, 2003

(54) NAVIGATION SYSTEM AND METHOD FOR TRACKING THE POSITION OF AN OBJECT

(75) Inventors: Keith J. Brodie, Irvine, CA (US); Stephen F. Rounds, Irvine, CA (US); Mangesh M. Chansarkar, Sunnyvale, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/085,667

(22) Filed: Feb. 26, 2002

(65) Prior Publication Data

US 2002/0128775 A1 Sep. 12, 2002

Related U.S. Application Data

(63) Continuation of application No. 09/662,559, filed on Sep. 15, 2000, now Pat. No. 6,453,238.
(60) Provisional application No. 60/154,003, filed on Sep. 15, 1999.

(51) Int. Cl.[7] .......................... H04B 7/185; G01S 5/02; G01C 17/38
(52) U.S. Cl. ........................ 701/216; 701/217; 342/457
(58) Field of Search ................................ 701/216, 217, 701/220, 205, 224, 213, 214, 215; 342/357.14, 457, 357.02; 702/92, 94; 73/178 R; 340/988

(56) References Cited

U.S. PATENT DOCUMENTS

| 4,899,285 | A |   | 2/1990 | Nakayama et al. | 701/220 |
|---|---|---|---|---|---|
| 5,075,693 | A |   | 12/1991 | McMillan et al. | 342/457 |
| 5,223,844 | A |   | 6/1993 | Mansell et al. | 342/357.07 |
| 5,311,195 | A |   | 5/1994 | Mathis et al. | 342/357.14 |
| 5,334,986 | A | * | 8/1994 | Fernhout | 342/357 |
| 5,394,333 | A |   | 2/1995 | Kao | 701/217 |
| 5,416,712 | A | * | 5/1995 | Geier et al. | 364/450 |
| 5,436,840 | A |   | 7/1995 | Lam et al. | 701/208 |
| 5,440,484 | A |   | 8/1995 | Kao | 701/207 |
| 5,488,559 | A |   | 1/1996 | Seymour | 701/208 |
| 5,490,073 | A |   | 2/1996 | Kyrtsos | 701/207 |
| 5,525,998 | A | * | 6/1996 | Geier | 342/357 |
| 5,644,317 | A |   | 7/1997 | Weston et al. | 342/357.14 |
| 5,745,868 | A | * | 4/1998 | Geier | 701/216 |
| 5,862,511 | A | * | 1/1999 | Croyle et al. | 701/213 |
| 5,890,092 | A |   | 3/1999 | Kato et al. | 701/216 |
| 5,902,351 | A |   | 5/1999 | Streit et al. | 701/220 |
| 5,923,270 | A |   | 7/1999 | Sampo et al. | 340/988 |
| 5,928,309 | A |   | 7/1999 | Korver et al. | 701/214 |
| 5,948,043 | A |   | 9/1999 | Mathis | 701/208 |
| 6,014,610 | A | * | 1/2000 | Judge et al. | 702/92 |
| 6,024,655 | A |   | 2/2000 | Coffee | 473/407 |
| 6,029,111 | A |   | 2/2000 | Croyle | 701/207 |
| 6,041,280 | A |   | 3/2000 | Kohli et al. | 701/201 |
| 6,047,234 | A |   | 4/2000 | Cherveny et al. | 701/200 |
| 6,091,359 | A | * | 7/2000 | Geier | 342/357.14 |

FOREIGN PATENT DOCUMENTS

WO    WO 98/49577    4/1998

* cited by examiner

Primary Examiner—Tan Q. Nguyen
Assistant Examiner—Dalena Tran
(74) Attorney, Agent, or Firm—Shemwell Gregory & Courtney LLP

(57) ABSTRACT

A navigation system for tracking the position of an object includes a GPS receiver responsive to GPS signals for periodically providing navigation state measurement updates to a navigation processor. The system also includes a dead-reckoning sensor responsive to movement of the object for providing movement measurements to the navigation processor. The navigation processor determines object navigation states using the navigation state measurement updates and propagates the object navigation states between measurement updates using the movement measurements.

18 Claims, 5 Drawing Sheets

NAVIGATION SYSTEM AND METHOD FOR TRACKING THE POSITION OF AN OBJECT

RELATED APPLICATION

This application is a continuation of application Ser. No. 09/662,559 filed Sep. 15, 2000, now U.S. Pat. No. 6,453,238, and claims benefit of provisional application Ser. No. 60/154,003 filed Sep. 15, 1999.

BACKGROUND OF THE INVENTION

1. Field of the Invention

The invention relates generally to navigation systems and more particularly to a system and method of calibrating sensors in a navigation system utilizing dead-reckoning mechanisms in conjunction with GPS devices to determining the position of vehicles while the vehicle is traversing through areas of Global Positioning Satellite (GPS) signal outage.

2. Description of Related Art

It is often desirable to maintain location information on objects such as vehicles traveling through areas of partial or total GPS signal blockage or areas that present multi-path signals, or areas where external interferences cause GPS signal outage. Such areas may include urban canyons having natural and/or artificial structures causing partial or complete GPS signal blockage. For example, an airport location provides a challenge as there are generally numerous partial and total blockages due to overhead roadways, underground tunnels and densely populated artificial structures comprising the airport.

Typical navigation systems use dead-reckoning sensors to navigate through areas of partial or total GPS signal blockage. Dead-reckoning navigation systems utilize inertial measurements mechanisms, such as a flywheel, to provide navigation during partial signal outages. Sensors used in GPS-Dead-Reckoning (GPS-DR) systems include rate gyroscopes, magnetic heading sensors, accelerometers, odometers and differential odometers or wheel tick sensors. Automotive GPS applications suffer performance degradation when signals from the GPS satellites are blocked or reflected by local terrain, buildings, tunnels, and the vehicle itself. In certain applications, an automotive navigation system may still be required to provide an output even when the satellites are not visible. Use of a dead-reckoning system in these intervals is common practice. In particular, a GPS-DR system which uses a gyroscope to maintain heading and vehicle odometer input pulses to determine distance traveled is well known.

GPS and inertial sensor solutions provide a synergistic relationship when used together in hybrid navigation systems. The integration of these two types of solutions not only overcomes performance issues found in each individual solution, but produces a system whose performance exceeds that of the individual solutions. GPS provides bounded accuracy, while inertial system accuracy degrades with time.

In navigation systems, GPS receiver performance issues include susceptibility to interference from external sources, time to first fix, i.e., first position solution, interruption of the satellite signal due to blockage, integrity, and signal reacquisition capability. The performance issues related to inertial sensors are their associated quality and cost.

A primary concern with using GPS as a stand alone source for navigation is signal interruption. Signal interruption can be caused by shading of the GPS antenna by terrain or manmade structures, e.g., buildings, vehicle structure, and tunnels, or by interference from an external source. Generally, when only three usable satellite signals are available, most GPS receivers revert to a two-dimensional navigation mode by utilizing either the last known height or a height obtained from an external source. However, if the number of usable satellites is less than three, some receivers have the option of not producing a solution or extrapolating the last position and velocity solution forward in what is called "dead-reckoning" (DR) navigation. Position aiding from the inertial system can be used to help the GPS receiver reacquire the satellite signal. By sending vehicle position to the receiver, the receiver can accurately estimate the range from the given position to the satellites and thus initialize its internal code loops.

Generally, inertial sensors are of two types—gyroscopes and accelerometers. The output of a gyroscope is a signal proportional to angular movement about its input axis and the output of an accelerometer is a signal proportional to the change in velocity sensed along its input axis. A three-axis inertial measurement unit (IMU) would then require three gyroscopes and three accelerometers to inertially determine its position and velocity in free space.

One of the significant factors related to the quality of an inertial system is the drift of the gyroscopes, measured in degrees/hour. The drift of a gyro is a false output signal caused by deficiencies during the manufacturing of the sensor. In inertial sensors, these are caused by mass unbalances in a gyroscope's rotating mass and by non-linearities in the pickoff circuits as is seen in fiber-optic gyroscopes. This false signal is in effect telling the navigation system that the vehicle is moving when it is actually stationary. The manufacturing cost of gyros with low drift is approximately $1,000. An inertial unit with a drift from 1 to 100 deg/hr are currently priced from approximately $1,000 to $10,000. Inertial units providing accuracies of less than 1 deg/hr are available at prices significantly higher, ranging from ten to one hundred times the cost associated with lesser accurate units.

As can be seen, the quality of the inertial sensors has a large role in the cost effectiveness of a navigation system. If 0.0001-deg/hr gyroscopes were relatively inexpensive, GPS may not be needed today. However, in actuality, inertial sensors are expensive, and a significant result of the integration of GPS with inertial sensors is the ability to use lower performing, more cost-effective sensors. As mentioned above, during the operation of a navigation system when both GPS and inertial components are operational, the inertial navigation errors are bounded by the accuracy of the GPS solution. Thus, one significant contribution the GPS receiver makes to the operation of the inertial subsystem is the calibration of the inertial sensors. Inertial instruments are specified to meet a turn-on to turn-off drift requirement (each time a gyro is powered up, its initial drift rate differs.)

The major errors associated with inertial sensors used in conjunction with GPS systems (GPSI systems) are the gyro bias and accelerometer bias. The gyro bias and accelerometer bias typically occupy six of the states within an inertial or GPSI Kalman filter. During the operation of a GPSI system, the Kalman filter produces an estimate of these biases as derived from the velocity data received from the GPS receiver.

Integrated GPS systems, wherein GPS sensors are used in conjunction with inertial sensors (GPSI systems) have typically been accomplished by utilizing a single Kalman filter to estimate the navigation state and sensor errors. Kalman filtering is a statistical technique that combines a knowledge of the statistical nature of system errors with a knowledge of system dynamics, as represented as a state space model, to arrive at an estimate of the state of a system. In a navigation system, we are usually concerned with position and velocity, at a minimum, but its not unusual to see filters for system models with state vector dimensions ranging from six to sixty. The state estimate utilizes a weighting function, called the Kalman gain, which is optimized to produce a minimum error variance.

These designs have proven effective with high-quality inertial sensors but involve substantial costs. Unfortunately, increasing the Kalman filter state vector size involves substantial design time, tuning complexity, risk of numerical difficulties, and processing power costs. This often forces navigation designers into a harsh trade between estimating significant instrument errors and increasing state vector size.

Existing GPS-DR hybrid systems have evolved into several classes, switched and filtered. The switched and filtered GPS-DR hybrid systems are feed-forward designs which calibrate the instruments when GPS is available but do not use the dead-reckoning instruments to improve the operation of the GPS receiver.

Switched GPS-DR systems are simple and commonly available today. These systems are effective against a blockage, but do not offer increased resistance to multi-path or improved signal reacquisition. Switched GPS-DR systems typically use NMEA output from the GPS receiver and are therefore GPS vendor independent. The system switches between two states depending on the quality of the GPS solution. The two states include providing unaided GPS output or providing the dead-reckoning state propagated with the gyro and odometer. When the GPS solution quality is satisfactory the GPS velocity vector is used to update estimates of the odometer scale factor, heading, and gyro bias.

Filtered GPS-DR systems provide two independent navigation solutions, one based upon GPS and the other based upon DR sensors and/or map-matching information. The solutions are combined to produce a best solution for output or display. As in the switched system, the combined solution is not fed back to the GPS receiver to aid in rejecting multi-path or signal reacquisition. There are several map-matched implementations of this class of systems available today. In general map matching provides a path constraint which can be used to calibrate the DR sensors directly or to filter the GPS output before using the combined state to calibrate the sensors.

Hence, those concerned with improving efficient application of navigation systems while minimizing costs have recognized a need for a cost effective alternative to the single Kalman filter navigation system design. Furthermore, a need exists for an alternative to the switched aid filtered GPS-DR design that provides a feed back of DR measurements to improve the solution of the GPS-DR solution. This invention fulfills those needs and others.

SUMMARY OF THE INVENTION

Briefly, and in general terms, the present invention relates to an integrated GPS-DR navigation system that uses dead-reckoning (DR) measurements to propagate the navigation states in the GPS receiver.

In a first aspect, the invention relates to a navigation system for tracking the position of an object. The navigation system includes a GPS receiver responsive to GPS signals for periodically providing navigation state measurement updates to a navigation processor. The system also includes a dead-reckoning sensor responsive to movement of the object for providing movement measurements to the navigation processor. The navigation processor determines object navigation states using the navigation state measurement updates and propagates the object navigation states between measurement updates using the movement measurements.

By utilizing the dead-reckoning sensors to propagate the GPS receiver's navigation state between measurement updates, the present invention reduces the uncertainty, or process noise, associated with advancing the state from one measurement epoch to the next. The reduced uncertainties allow for a less noisy state estimation, a tighter constraint on measurements for rejection of multi-path, and improved reacquisition because of the availability of the dead-reckoned state to provide superior pre-positioning data.

In a detailed aspect, the navigation processor includes a navigation update unit that receives as input an updated dead-reckoning measurement and the navigation state measurement updates and provides as output navigation measurements and a modified dead-reckoning position measurement. The navigation update unit further includes a sensor update unit that receives as input the navigation measurements and the movement measurements and provides as output position changes. Also included in the navigation update unit is a navigation propagation unit that receives as input the position changes and the modified dead-reckoning measurement and provides as output the updated dead-reckoning measurement.

In a second aspect, the invention relates to a method of tracking the position of an object. The method includes periodically obtaining navigation state measurement updates and processing the navigation state measurement updates to determine object navigation states. The method also includes obtaining movement measurements related to object movement and propagating the object navigation states between measurement updates using the movement measurements.

In a third aspect, the invention relates to a navigation system for providing navigation information related to the movement of an object. The navigation system includes a global positioning satellite (GPS) receiver mounted to the object for receiving GPS signals and providing GPS measurements. The system further includes a navigation update unit that receives as input an updated dead-reckoning measurement and the GPS measurements and provides as output navigation measurements and a modified dead-reckoning position measurement. The system also includes at least one inertial sensor mounted to the object for sampling movement measurements and providing as output the movement measurements. Also included in the system in a sensor update unit that receives as input the navigation measurements and the movement measurements and provides as output position changes. The system also includes a navigation propagation unit that receives as input the position change and the modified dead-reckoning measurement and provides as output the updated dead-reckoning measurement.

In a detailed aspect of the invention, the navigation measurements include measurement changes in at least one of heading, gyro bias, gyro scale factor, speed bias, and speed scale factor. In another detailed facet of the invention, the sensor update unit includes a first processor for processing the changes in heading, gyro bias, and gyro scale factor along with the gyro measurement to produce a heading measurement and a second processor for processing the changes in speed bias and speed scale factor along with the speed measurement to produce changes in direction measurements. In another detailed aspect of the invention, the navigation update unit includes a first filter receiving as input the updated dead-reckoning measurement and the GPS measurements and providing as output an estimated velocity value, a second filter for estimating changes in heading, gyro bias, and gyro scale factor from first a measurement derived from the estimated velocity value and a third filter for estimating change in speed bias and speed scale factor from a second measurement derived from the estimated velocity value.

In its most basic form, the navigation system closely mimics the traditional single Kalman filter design by integrating separate GPS-navigation (first), heading (second) and speed (third) Kalman filters. This configuration makes up the federated filter architecture of the current invention. The federated filter architecture very nearly matches the single Kalman filter architecture thereby achieving the benefits of the single Kalman filter architecture at a substantially reduced throughput cost.

In a fourth aspect, the invention relates to a method of providing navigation information related to the movement of an object. The method includes receiving GPS signals by a global positioning satellite (GPS) receiver mounted to the object and providing as output GPS measurements. Also included is calculating navigation measurements and a modified dead-reckoning position measurement from an updated dead-reckoning measurement and the GPS measurements. Further included is the sampling of movement measurements by at least one inertial sensor mounted to the object, the processing of position changes from the navigation measurements and the movement measurements and the propagation of the updated dead-reckoning measurement calculated by the position change and the modified dead-reckoning measurement.

The navigation system is capable of calibrating the rate gyro bias, gyro scale factor, and odometer pulse scale factor and provides the advantage of continuous calibration of the sensor input data to provide accurate position solutions. One advantage of the system and method of the invention is the capability of using the dead-reckoning sensors in a feed back design to propagate the navigation state as they are calibrated. This continuous feed back propagation thereby reduces the process noise model in the primary navigation filter to take advantage of the reduced uncertainty in vehicle dynamics. The system further provides for adapting the measurement editing algorithm to take advantage of the reduced dynamic uncertainty allowing for tighter edit criteria to eliminate some multi-path corrupted measurements.

In a detailed aspect, the invention utilizes the last stored position, stored heading, the gyro and the odometer to generate a dead-reckoning navigation solution prior to the acquisition of GPS thereby providing a more efficient reacquisition solution. In another detailed aspect, the invention utilizes the zero turn-rate measurement to calibrate the gyro bias at start-up and allows for starting the heading sub-filter before the primary GPS filter starts to take advantage of the availability of the zero turn-rate measurement prior to the acquisition of GPS signals.

In a detailed facet of the invention, each individually integrated Kalman filter (KF), i.e., the primary navigation KF, heading KF, and speed KF, performs different estimation functions. The primary navigation KF is used as a position, velocity and clock state estimator. Although this filter is not substantially altered for adaptation in the present invention, there are modifications to the tuning parameters, changes to the process noise model, and changes in the moding logic and mechanisms to navigate with degraded constellations based on the availability of a dead-reckoning state. In another detailed aspect of the invention, the navigation system resets any of the three filters without resetting the other two thereby providing the advantage of continuous solution maintenance.

Furthermore, the system allows for estimating road grade from altitude changes when GPS is available, decaying the estimated road grade to zero after entering an outage with no GPS-based visibility of altitude, using the estimated road-grade to divide the odometer measured distance traveled into horizontal and vertical components for use in propagating the state-vector, and performing independent checks of the heading, speed, and primary Kalman filters against floors, ceilings, and correlation coefficient range limits.

These and other aspects and advantages of the invention will become apparent from the following detailed description and the accompanying drawings, which illustrate byway of example, the features of the invention.

DETAILED DESCRIPTION OF THE PREFERRED EMBODIMENTS

Figure 1:
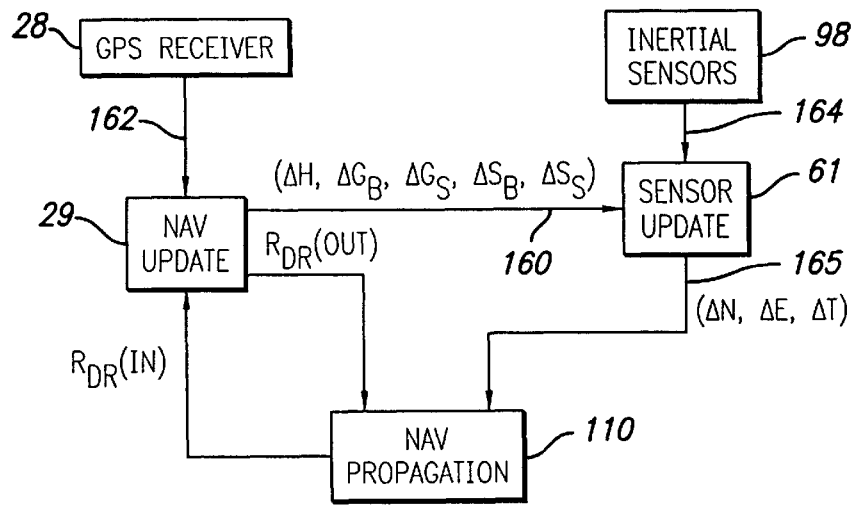
FIG. 1 is a block diagram depicting a navigation system incorporating aspects of the present invention.

Referring now to the drawings, wherein like reference numerals denote like or corresponding parts throughout the drawing figures, and particularly to FIG. 1, there is shown a navigation system incorporating aspects of the present invention. The system itself is typically employed within a moving object, such as an automobile or other vehicle. The system includes a navigation update unit 29, a sensor update unit 61 and a navigation propagation unit 110. The navigation update unit 29 receives as inputs GPS measurements 162 from a GPS receiver 28 and dead-reckoning measurements $R_{DR(in)}$. Using these measurements, the navigation update unit 29 calculates changes in navigation measurements 160. The navigation measurements 160 includes changes in heading $\Delta H$, gyro bias $\Delta G_B$, gyro scale factor $\Delta G_S$, speed bias $\Delta S_B$ and speed scale factor $\Delta S_S$. The navigation measurements 160 are fed into the sensor update unit 61. Additionally, the navigation update unit 29 provides as output a dead-reckoning measurement $R_{DR(out)}$ for input into the navigation propagation unit 110.

The sensor update unit 61 receives movement measurements 164 provided by inertial sensors 98 and the navigation measurements 160 from the navigation update unit 29. Using these inputs, the sensor update unit 61 produces position-change measurements 165, including changes in north/south heading ΔN, east/west heading ΔE and time change measurement, time ΔT. The position-change measurements 165 of the sensor update unit 61 and the dead-reckoning measurement $R_{DR(out)}$ of the navigation update unit 29 are utilized by the navigation propagation unit 110 to calculate a new or modified dead-reckoning measurement $R_{DR(in)}$. This new dead-reckoning measurement $R_{DR(in)}$ is fed back to the navigation update unit 29 where it is once again processed. This feedback processing is continuously repeated.

Figure 2:
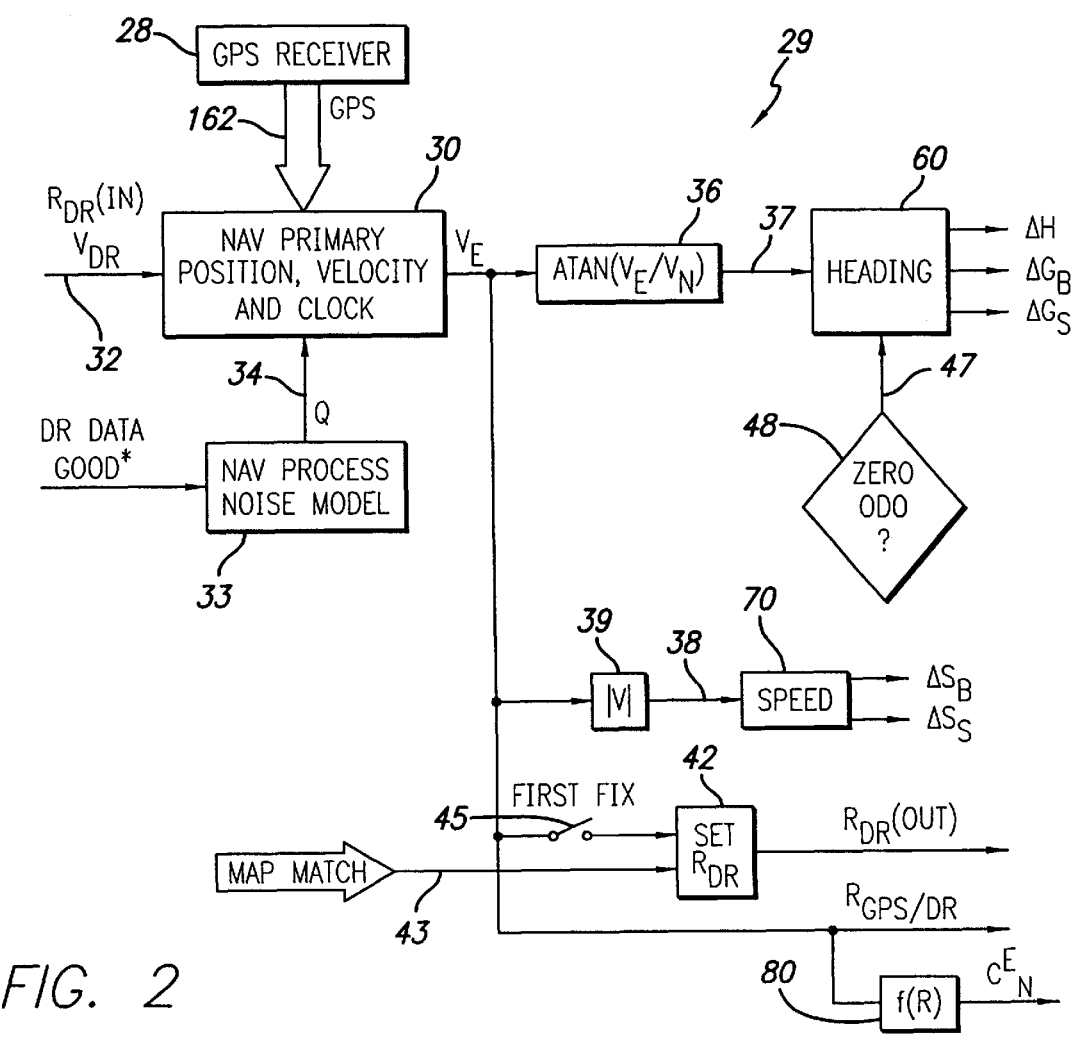
FIG. 2 is a block diagram of the navigation update unit utilizing a federated filter architecture.

Referring to FIG. 2, the navigation update unit 29 includes a primary filter 30, heading filter 60, and speed filter 70. In a preferred embodiment of the invention the filters are Kalman filters (KF). The primary filter 30 accepts as input GPS measurements 162 from the GPS receiver 28, dead-reckoning position $R_{DR(in)}$ measurements, velocity measurements $V_{DR}$ and a process noise matrix Q provided from a process noise model 33. From these various inputs, the primary navigation filter 30 calculates an estimated GPS velocity measurement $V_E$. The primary filter 30 is connected to the heading filter 60, speed filter 70 and a dead-reckoning position set unit 42.

The heading filter 60 has three states, heading error, gyro bias error, and gyro scale factor error. The heading filter 60 uses two measurement types. The first is the heading estimate 37 derived from the GPS velocity estimate $V_E$, which is updated by the primary filter 30. The second measurement type is a zero turn-rate measurement 47, which is provided when the vehicle odometer is reporting 48 that the vehicle is stopped. This zero turn-rate measurement 47 is often available at turn-on, before the vehicle starts to move, and prior to the acquisition of GPS signals. This measurement is used to initialize the heading filter 60 and to begin dead-reckoning navigation using saved initial position and heading measurement values prior to the acquisition of GPS signals. The capability of the heading KF 60 to initialize and run prior to the primary navigation KF 30 is yet another advantage of the present invention.

The mathematics associated with the heading filter 60 are as follows, the state transition matrix for the heading filter 60 is:

$$X_{t+\Delta t} = \Phi X_t \quad \text{(Eq. 1)}$$

where the heading error, bias error, and scale factor error form the state as:

$$X = \begin{bmatrix} \delta H \\ \delta B \\ \delta S \end{bmatrix} \quad \text{(Eq. 2)}$$

and the state transition matrix using as ω the mean rate measured on the propagation interval is:

$$\Phi = \begin{bmatrix} 1 & \Delta t & \omega \cdot \Delta t \\ 0 & 1 & 0 \\ 0 & 0 & 1 \end{bmatrix} \quad \text{(Eq. 3)}$$

the covariance propagation equation for the heading filter 60 is of the standard form:

$$P_{t+\Delta t} = \Phi \cdot P_t \cdot \Phi^T + Q \quad \text{(Eq. 4)}$$

where Q is the process noise matrix provided by the process noise model 33. Q is based on the assumption that there is random walk in each of the error terms and is of diagonal form.

The covariance matrix P is checked against upper and lower limits on each propagation and the update cycle to ensure that the variances remain in the allowed range and the correlation coefficients are in [−1, 1].

The zero turn-rate measurement matrix is of the form:

$$h_1 = [0 \ 1 \ 0] \quad \text{(Eq. 5)}$$

The measurement residual is the reported gyro rate. The measurement update for the zero turn-rate measurement 47 is of the usual form, with gain $$K = \frac{P \cdot h_1^T}{h_1 \cdot P \cdot h_1^T + R} \quad \text{(Eq. 6)}$$

where the measurement noise value R is chosen as a constant to represent the smallest possible turn-rate of the vehicle assuming the odometer pulses have a "dead-zone" near zero velocity and considering that the car must be accelerating but may not have triggered the first pulse. The state and covariance update with the gain are of the usual form.

As described above, the heading measurement 37 to the heading filter 60 is derived from the velocity estimate $V_E$ of the primary filter 30 as:

$$H_{GPS} = \tan^{-1}(V_E/V_N) \quad \text{(Eq. 7)}$$

The heading measurement partial derivative matrix is:

$$h_2 = [1 \ 0 \ 0] \quad \text{(Eq. 8)}$$

The gain and update equations are the same as for the zero turn-rate measurement 48.

Referring still to FIG. 2, the speed filter 70 has two states, a speed bias state and an odometer scale factor state. Where applicable, the speed bias state may be designed to estimate velocity disturbances generated by selective availability (SA), which is a purposeful degradation of GPS signals that raises the value of the user range error. The speed bias prevents the SA velocity disturbances from corrupting the odometer scale factor estimation. The speed bias state is a fictitious state in that there is no physical mechanism for a bias in a wheel-tick sensor. However, the speed bias state has proven effective in GPS operation.

As the automotive industry moves away from a drive wheel rotation sensor towards individual wheel tick sensors, the definition of the speed pulses will become more varied. Composite speed pulses may be generated to support the speedometer and cruise control functions, or these may be replaced with messaging on a data bus. It is noted that composite speed signals generated by the manufacturer's control unit may have a speed bias, particularly if they use inductive wheel tick sensors and attempt to compensate for loss of data at very low speeds. The present invention has been applied to and tested with one composite speed signal generated by the manufacturer's control unit using wheel tick sensors from all four wheels with good results. Therefore, the present invention may be utilized in conjunction with future automotive innovations.

The navigation update unit 29 provides map-matching position updates to the dead-reckoned state vector $R_{DR(out)}$. This is accomplished by utilizing the estimated velocity $V_E$ provided by the primary filter 30 as an input into the dead-reckoning position set unit 42. The set unit 42 receives the $V_E$ after a switch 45 is triggered. Once triggered, the set unit 42 combines a map-matched position measurement 43 with a position measurement calculated from $V_E$ and produces as output a dead-reckoning position measurement $R_{DR(out)}$ that is updated by the map-matched position measurement. Generally, this usage of map-matching is common to navigation systems and is essential to automotive applications.

As described above, the primary filter 30 may also take as input a process noise matrix Q generated from the process noise model 33. This occurs when the dead-reckoning data is good. Dead-reckoning date is good when gyro and odometer data are available, the odometer scale factor and heading have been initialized, and the heading filter 60 has been updated twice to estimate the gyro bias $G_B$ and gyro scale factor $G_S$. The Q matrix produced by the process noise model 33 is used by the primary filter 30 to more accurately calculate the velocity estimation $V_E$ to be supplied to the heading filter 60 and speed filter 70.

Figure 3:
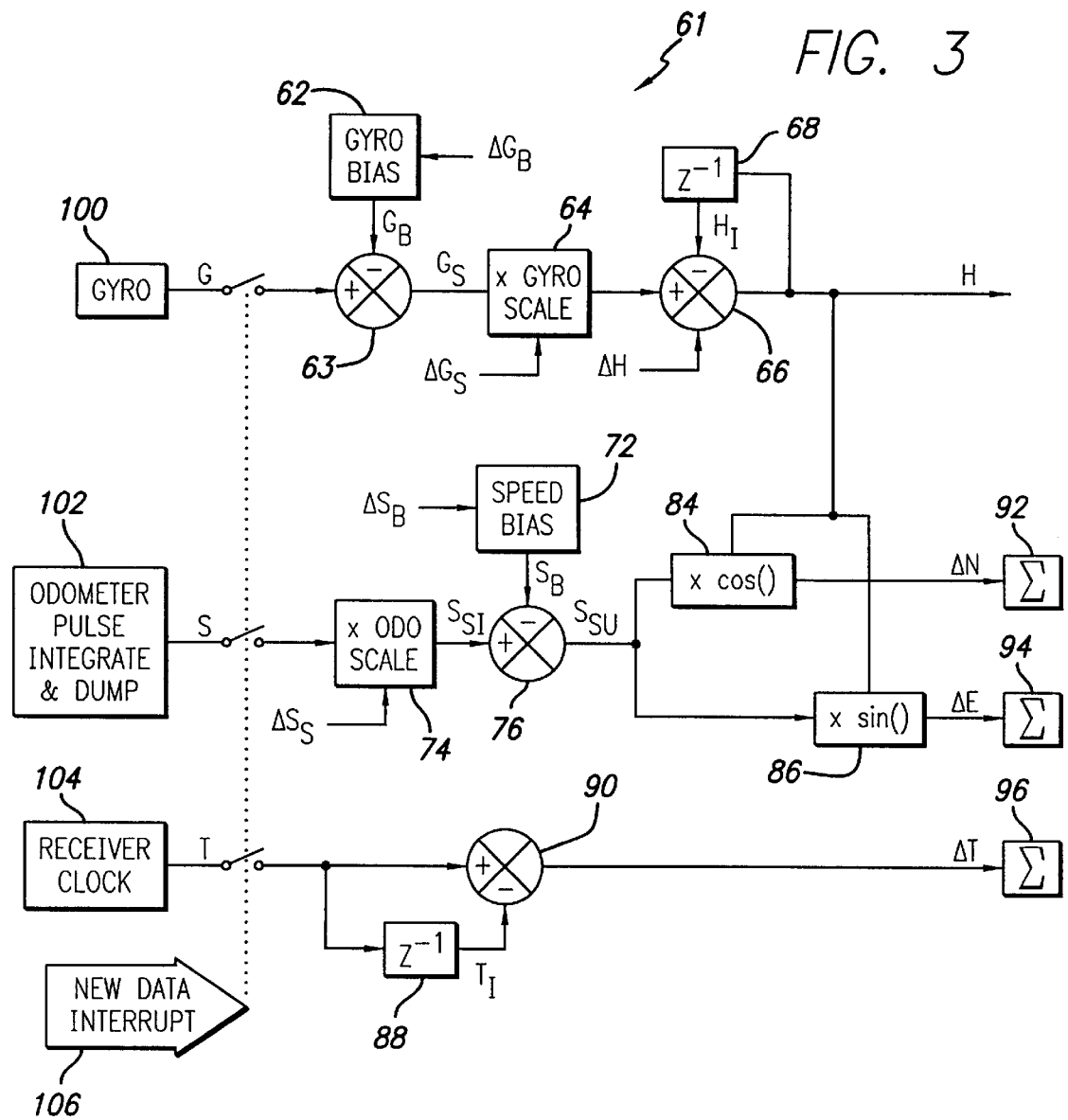
FIG. 3 is a block diagram of the sensor update unit of FIG. 1 depicting the outputs of heading and speed filters utilized to update the instrument error states of the inertial sensors employed in the present invention.

Referring to FIG. 3, the heading filter 60 and speed filter 70 (FIG. 2) produce updates to the instrument error states which may be utilized by the sensor update unit 61 when calculating changes in position. The heading filter 60 of the navigation update unit 29 produces as output, a change in heading $\Delta H$, a change in gyro bias $\Delta G_B$, and a change in gyro scale factor $\Delta G_S$. The speed filter 70 of the navigation update unit 29 produces as output, a change in speed bias $\Delta S_B$ and a change in speed scale factor $\Delta S_S$.

The sensor update unit 61 includes a first processor, a gyro bias 62, gyro scale 64, integrator 68 and mixers 63, 66 and a second processor, comprising an odometer scale 74, speed bias 72, mixer 76 and trigonometric function units 84, 86. The change in gyro bias $\Delta G_B$ provided by the heading filter 60 of the navigation update unit 29 is used by a gyro bias unit 62 to generate a gyro bias value $G_B$. The gyro bias value $G_B$ and a gyro measurement G derived from sampling a gyro 100 at various time intervals serve as inputs to a mixer 63. The mixer 63 generates a gyro scale value $G_S$ that is inputted into a multiplier 64. The multiplier 64 multiplies the $G_S$ value with the change in gyro scale factor $\Delta G_S$ provided by the heading filter 60 to generate an updated gyro scale value for input into a mixer 66. Mixer 66 combines the updated gyro scale value, the change in heading measurement $\Delta H$ provided by the heading filter 60, and an integrated feedback heading value $H_I$ to generate a current heading value H. The integrated feedback heading value $H_I$ is calculated by an integration unit 68 utilizing the current heading value H provided by mixer 66. The feedback integration unit 68 is connected to mixer 66 in a loop configuration. The current heading value H may be used in a variety of ways, such as, to update a user display unit.

The change in speed scale factor $\Delta S_S$ provided by the speed filter 70 of the navigation update unit 29 and a speed measurement S derived from sampling an odometer pulse dump 102 serve as inputs to a multiplier 74. The multiplier 74 multiplies the two measurements and provides a speed scale value $S_S$ for input into a mixer 76. Mixer 76 generates an updated speed scale value $S_{SU}$ by mixing the speed scale value $S_S$ and a speed bias value $S_B$ provided by a speed bias unit 72. The speed bias unit calculates the speed bias value $S_B$ from the change in speed bias measurement $\Delta S_B$ provided by the speed filter 70.

The updated speed scale value $S_{SU}$ generated by mixer 76 and the heading value H generated by mixer 66 serve as inputs to a cosine function unit 84. The cosine function unit 84 calculates from these input values changes in the north/south heading represented by $\Delta N$. The values of $\Delta N$ are summed up by a summation unit 92 to provide a single $\Delta N$ output value. Additionally, the values $S_{SU}$ and H are used by a sine function unit 86 to calculate changes in the east/west heading represented by $\Delta E$. The values of $\Delta E$ are collected and summed up by a summation unit 94 to provide a single $\Delta E$ output value.

Finally, the sensor update unit 61 receives a time measurement T by sampling time values from a receiver clock 104. The time measurement T are sampled concurrently with the sampling of the gyro 100 and the odometer 102 as controlled by a new data interrupt signal 106. The time measurement T is mixed with its integrated value $T_I$, as calculated by an integration unit 88, to provide a changes in time value $\Delta T$. The values of $\Delta T$ are collected and summed up by a summation unit 96 to provide a single $\Delta T$ output value.

Figure 4:
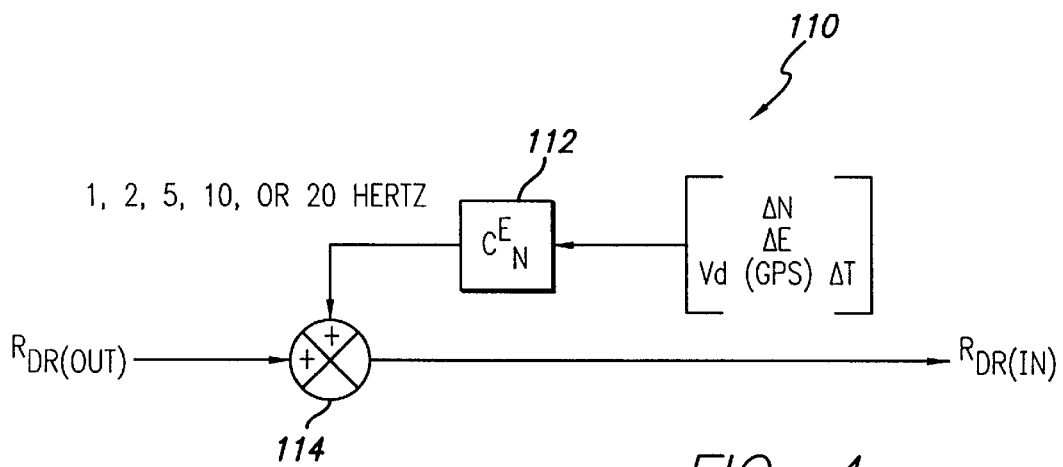
FIG. 4 is a block diagram of the navigation propagation unit depicting the propagation of calibrated dead-reckoning measurements.

Referring to FIG. 4, the dead-reckoning position measurement $R_{DR(out)}$ provided by the navigation update unit 29 serve as one input to mixer 114. The other input to mixer 114 consists of the changes in direction and time ($\Delta N$, $\Delta E$, and $\Delta T$) provided by the sensor update unit 61. The values of $\Delta N$, $\Delta E$, and $\Delta T$ are converted by conversion unit 112 into the earth-centered earth-fixed coordinate system. Mixer 114 combines the two measurements and provides an updated dead-reckoning position $R_{DR(in)}$ measurement. This $R_{DR(in)}$ value is propagated back to the navigation update unit 29. The propagation of the $R_{DR(in)}$ back to the navigation update unit provides reduced uncertainty in the vehicle dynamics thereby reducing the process noise model in the primary filter 30 of the navigation update unit 29. Furthermore, the reduced uncertainty achieved allows for tighter edit criteria thereby allowing the system to reject GPS measurements falling outside the range of measurements provided by the tighter edit criteria. Therefore, the system is capable of eliminating some multi-path corrupted measurements that may be mistaken by the GPS receiver 28 as good measurements.

Figure 5:
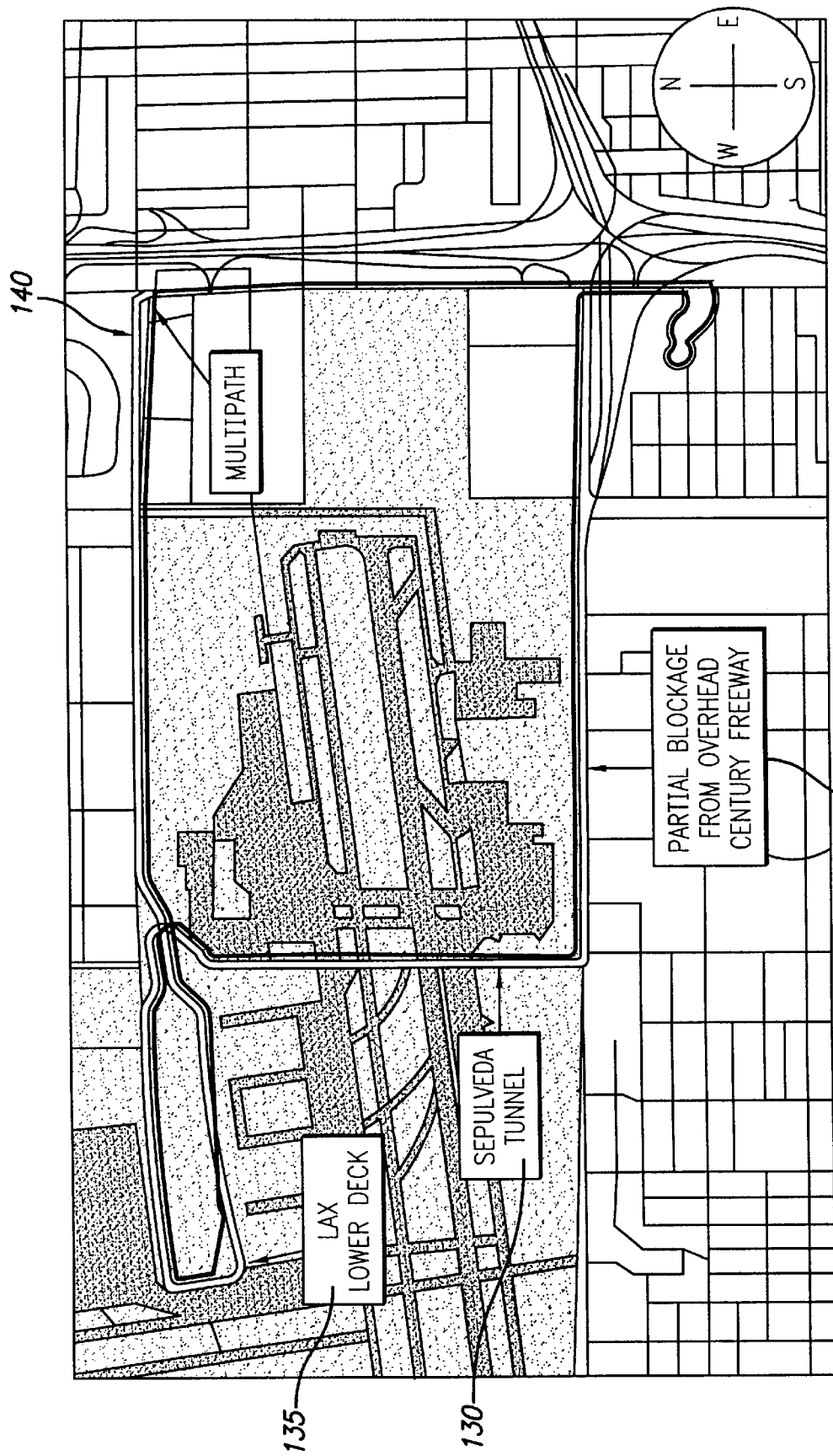
FIG. 5 is a map depicting the ground track over which a navigation system of the present invention was tested.

Referring to FIG. 5, the present invention was tested at Los Angeles International Airport (LAX). The LAX test course has several features that tests the present inventions capability. The Sepulvada tunnel 130 provides an area of complete blockage of GPS signals for approximately 23 seconds, the LAX lower deck 135 provides severe blockage of GPS signals for a period of approximately 90 seconds and includes a 180 degree turn at the west end of the airport, and the northeast corner 140 of the course provides a rich source of multi-path signals.

Figure 6:
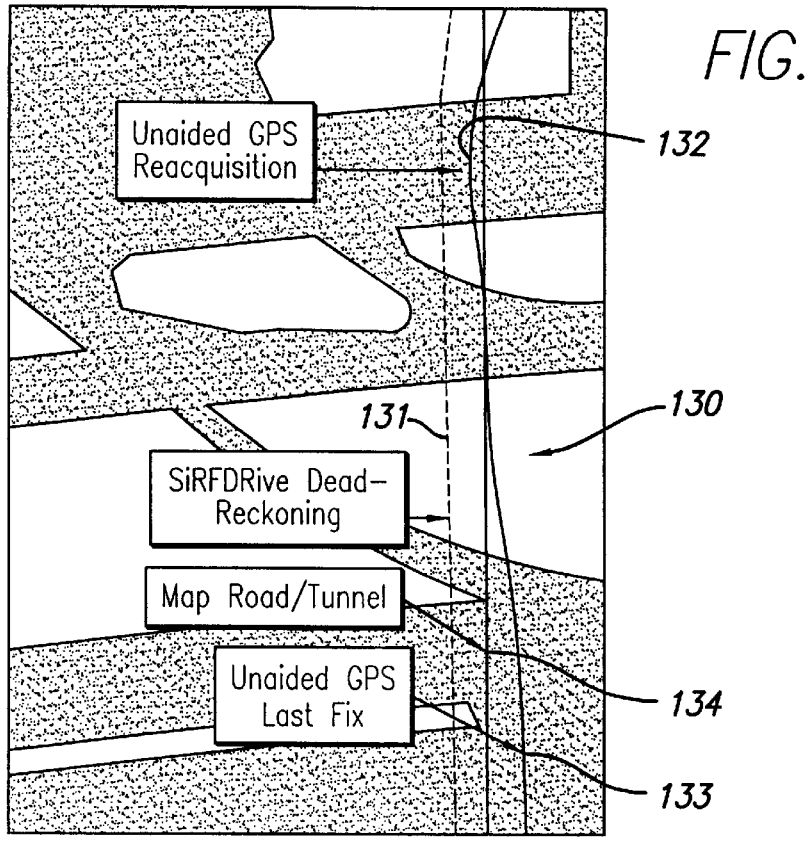
FIG. 6 is an enlarged detail taken from the map of FIG. 5, depicting performance of the present invention under complete blockage of GPS signals.

Referring to FIG. 6, an enlarged map is provided to illustrate the performance of the present invention while traversing the Sepulveda tunnel 130. The system experienced complete blockage for approximately 23 seconds. The results of the present invention, depicted by a dotted line 131 is clearly satisfactory as it closely parallels the mapped road/tunnel as depicted by line 134. The offset between the results obtained from the system 131 and the actual mapped road/tunnel 134 is due to selective availability (SA). Point 133 is the location of the last GPS position fix prior to entering the tunnel 130. Point 132 is the location of GPS reacquisition upon exiting the tunnel 130. As can be seen by the results obtained, there is no discernable horizontal position error growth during the signal outage. Because the tunnel is straight it can be inferred that the gyro bias was correctly estimated prior to entering the tunnel 130.

Figure 7:
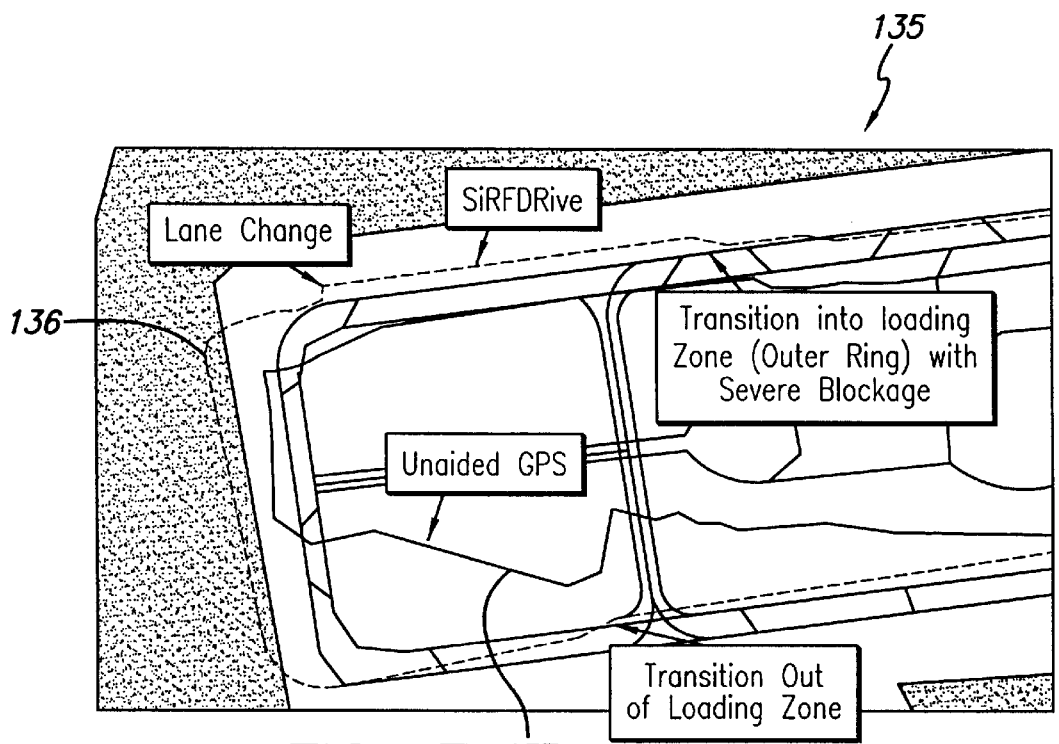
FIG. 7 is another enlarged detail taken from the map of FIG. 5, depicting performance of the present invention under maximum partial GPS signal blockage.

Referring to FIG. 7, an enlarged map is provided to illustrate the performance of the present invention while traversing the LAX lower deck 135. This area of the test course maximizes GPS signal blockage. While in this area, a system may occasionally pick up one or two low elevation satellites signals or multi-path signals, but the system is primarily blocked from any usable GPS signals. This type of blockage will generally force an unaided receiver into "no navigation" mode as can be seen from path line 137. However, as can be seen from the path line 136, generated by the present invention, the system of the present invention successfully dead-reckoned through the turn and reacquired GPS signals without any ground track discontinuity. The estimated growth in horizontal error from the dead-reckoning interval of 90 seconds is less than 30 meters (m). It can be inferred from the successful results of the present invention within this area of maximum blockage that the gyro bias and gyro scale factor were being successfully estimated by the heading filter.

Figure 8:
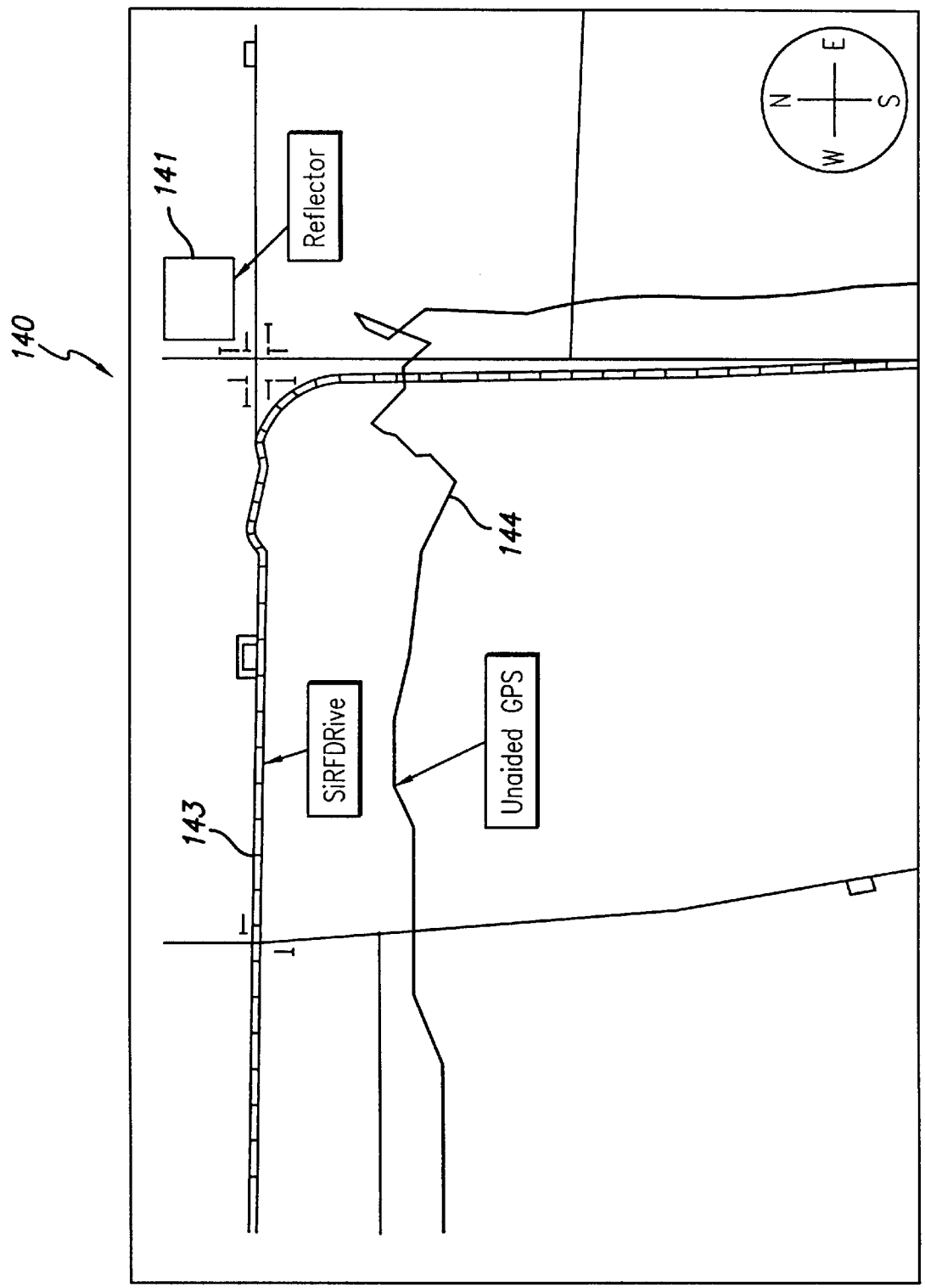
FIG. 8 is yet another enlarged detail taken from the map of FIG. 5, depicting performance of the present invention where the system is subject to severe multi-path signals.

Referring to FIG. 8, an enlarged map is provided to illustrate the performance of the present invention while traversing through areas subject to multi-path signals. The northeast corner 140 of the course provides such an area because situated therein is a large office building 141 having metallic surfaces that provides a rich source of multi-path signals. As can be seen from a plot result 143 provided by the navigation system of the present invention, substantially better performance and accuracy is achieved than is possible with conventional navigation systems, as seen from plot result 144. The dead-reckoning measurements of the present invention reduces the uncertainty in the time propagation of the position states and allow tighter screening of measurements for multi-path effects.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A navigation processor for use in conjunction with a GPS receiver and a dead-reckoning sensor to provide navigation information related to the movement of an object, the GPS receiver adapted to provide GPS measurements for the object and the dead-reckoning sensor adapted to provide movement measurements for the object, said processor comprising:
   a navigation update unit receiving as input an updated dead-reckoning measurement and the GPS measurements, and providing as output navigation measurements and a modified dead-reckoning position measurement, wherein the navigation measurements include measurement changes in speed bias;
   a sensor update unit receiving as input the navigation measurements including the speed bias and the movement measurements and providing as output position changes; and
   a navigation propagation unit receiving as input the position changes and the modified dead-reckoning measurement and providing as output the updated dead-reckoning measurement.

2. The processor of claim 1 wherein the navigation update unit comprises a primary filter adapted to receive as input the updated dead-reckoning measurement and the GPS measurements and provide as output an estimated velocity value.

3. The processor of claim 2 wherein the navigation update unit comprises a speed filter for estimating the change in speed bias from a measurement derived from the estimated velocity value.

4. The processor of claim 2 wherein the navigation update unit comprises a process noise model that provides a process noise matrix to the primary filter.

5. The processor of claim 2 wherein the navigation update unit comprises a heading filter for estimating changes in heading, gyro bias, and gyro scale factor from a heading measurement derived from the estimated velocity value.

6. The processor of claim 1 wherein the navigation update unit comprises a position set unit for eliminating the updated dead-reckoning measurement when the measurement is bad.

7. The processor of claim 1 wherein the navigation measurements further include measurement changes in at least one of heading, gyro bias and gyro scale factor, the movement measurements include a gyro measurement and the sensor update unit comprises a first processor for processing the changes in heading, gyro bias, and gyro scale factor along with the gyro measurement to produce a current heading value.

8. The processor of claim 1 wherein the navigation measurements further include measurement changes in speed value, the movement measurements include a speed measurement and the sensor update unit comprises a second processor for processing the changes in speed bias and speed scale factor along with the speed measurement to produce changes in direction measurements.

9. The processor of claim 1 wherein the movement measurements include a time measurement and the sensor update unit comprises a time processing unit to process the time measurement to produce a change in time value.

10. A method of providing navigation information related to the movement of an object using GPS measurements and movement measurements, said method comprising:
    processing an updated dead-reckoning measurement and the GPS measurements to provide navigation measurements and a modified dead-reckoning position measurement, wherein the navigation measurements include measurement changes in speed bias;
    processing the navigation measurements including the speed bias and the movement measurements to provide as output position change measurements; and
    processing the position change measurements and the modified dead-reckoning measurement to provide as output the updated dead-reckoning measurement.

11. The method of claim 10 wherein processing an updated dead-reckoning measurement and the GPS measurements to provide navigation measurements comprises:
    estimating a velocity value for the object;
    deriving a measurement from the estimated velocity value; and
    estimating the change in speed bias from the measurement.

12. The method of claim 10 wherein processing an updated dead-reckoning measurement and the GPS measurements to provide navigation measurements comprises:
    estimating a velocity value for the object;
    deriving a heading measurement from the estimated velocity; and
    estimating changes in heading, gyro bias, and gyro scale factor using the heading measurement.

13. The method of claim 10 wherein the movement measurements include a gyro measurement, the navigation measurements further include measurement changes in at least one of heading, gyro bias, gyro scale factor and processing the navigation measurements and the movement measurements comprises processing changes in heading, gyro bias, and gyro scale factor along with a gyro measurement to produce a current heading value.

14. The method of claim 10 wherein the movement measurements include a speed measurement, the navigation measurements further include measurement changes in speed scale factor and processing the navigation measurements and the movement measurements comprises processing the changes in speed bias and speed scale factor along with the speed measurement to produce changes in direction measurements.

15. The method of claim 10 wherein the movement measurements include a time measurement and processing the navigation measurements and the movement measurements comprises processing the time measurement to produce a change in time value.

16. A navigation update unit for use in tracking the movement of an object, said unit comprising:
   a primary filter adapted to receive as input an updated dead-reckoning measurement and GPS measurements, both related to the object, and provide as output an estimated velocity value for the object;
   a heading filter adapted to receiver as input a heading measurement derived from the estimated velocity value and provide as output estimated changes in heading, gyro bias, and gyro scale factor; and
   a speed filter for estimating the change in speed bias and speed scale factor from a measurement derived from an estimated velocity value.

17. The navigation update unit of claim 16 further comprising an object odometer for providing a zero turn-rate measurement to the heading filter.

18. A method of providing navigation information related to the movement of an object using GPS measurements from a GPS receiver and movement measurements from a dead-reckoning sensor, said method comprising:
   calibrating the dead-reckoning sensor with an estimate of at least a speed bias;
   calculating navigation measurements and a modified dead-reckoning position measurement from an updated dead-reckoning measurement and the GPS measurements;
   sampling movement measurements;
   processing position change measurements from the navigation measurements and the movement measurements; and
   propagating the updated dead-reckoning measurement using the position change measurements and the modified dead-reckoning measurement.

* * * * *